Nov. 17, 1964 C. A. SHERMAN Re. 25,686

MARK SENSING LUMBER DEFECT CUTTER

Original Filed March 2, 1959 4 Sheets-Sheet 1

INVENTOR.
CHARLES A. SHERMAN

BY Leslie G. Moller

ATTORNEY

MARK SENSING LUMBER DEFECT CUTTER

Original Filed March 2, 1959 4 Sheets-Sheet 2

INVENTOR.
CHARLES A. SHERMAN
BY Leslie G. Moller
ATTORNEY

MARK SENSING LUMBER DEFECT CUTTER
Original Filed March 2, 1959 4 Sheets-Sheet 3
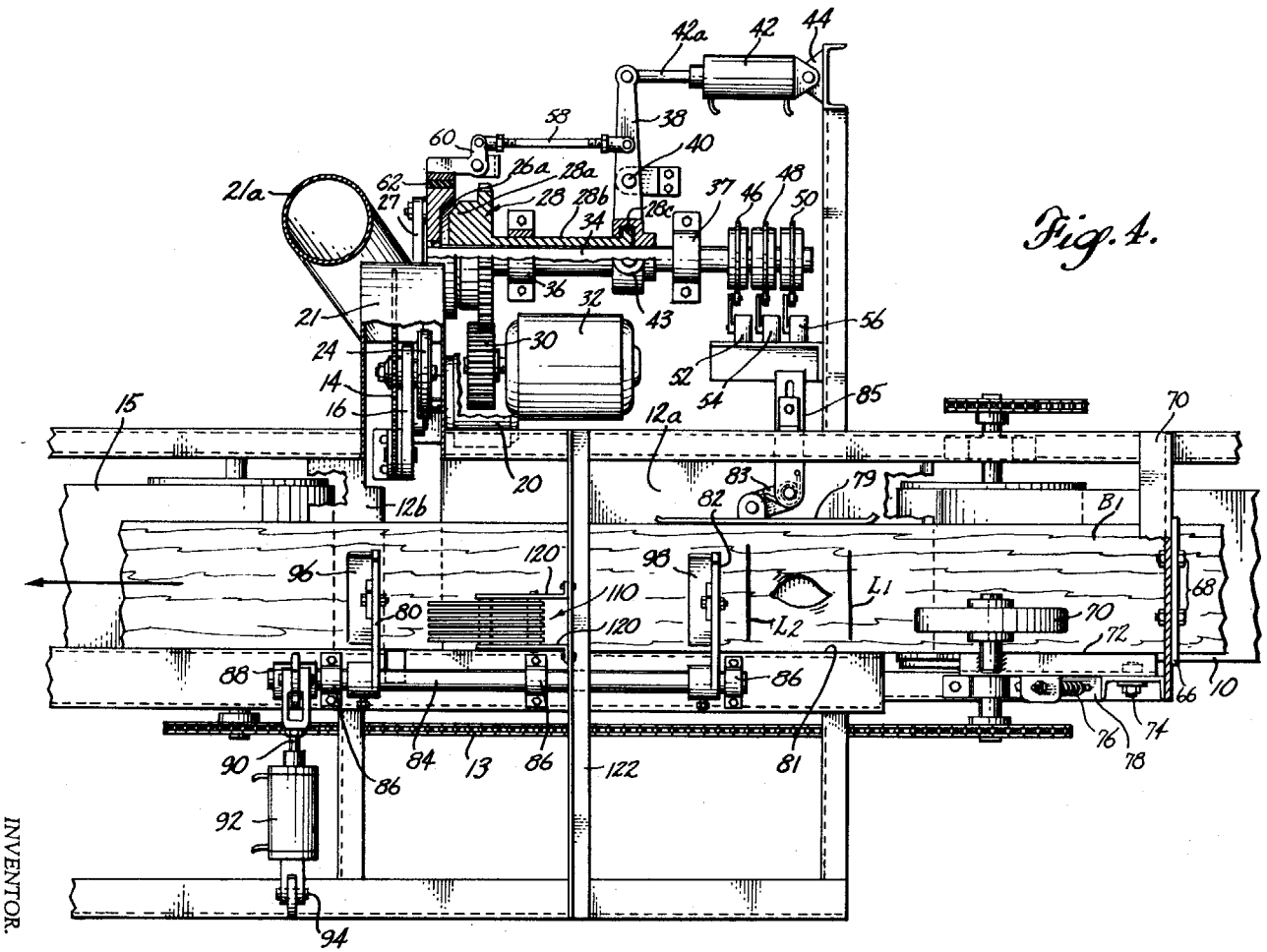
INVENTOR.
CHARLES A. SHERMAN
BY Leslie G. Nolle
ATTORNEY

MARK SENSING LUMBER DEFECT CUTTER

Original Filed March 2, 1959 4 Sheets-Sheet 4

INVENTOR.
CHARLES A. SHERMAN

BY Leslie G. Moller
ATTORNEY

United States Patent Office

Re. 25,686
Reissued Nov. 17, 1964

25,686

MARK SENSING LUMBER DEFECT CUTTER

Charles A. Sherman, Tacoma, Wash., assignor to Weyerhaeuser Company, Tacoma, Wash., a corporation of Washington Original No. 3,044,508, dated July 17, 1962, Ser. No. 796,657, Mar. 2, 1959. Application for reissue Nov. 15, 1963, Ser. No. 332,986
13 Claims. (Cl. 143—46)

Matter enclosed in heavy brackets [ ] appears in the original patent but forms no part of this reissue specification; matter printed in italics indicates the additions made by reissue.

This invention relates to improvements in apparatus for cutting defects from lumber, particularly for but not limited to the upgrading of boards or panels to be end trimmed. The invention is herein illustratively described by reference to the preferred form and application thereof; however, it will be recognized that certain modifications and changes therein with respect to details and uses may be made without departing from the essential features involved.

Top-grade board paneling for floors and walls must, of course, be free of checks, loose knots, planer skips, etc. Because of the extremely high cost of clear boards of matched lengths it is customary to sell and use random lengths in a further process of manufacture to produce glued-up stock. This is made possible by passing the boards through an end matcher, a machine which cuts tongue and groove formations on respectively opposite sides and respectively opposite ends of each board. Consequently, in preparing the boards for the end matcher it is desirable to sever a defective board at the location of each defect. With large defects (i.e. extending over a material length portion of the board) it is necessary to make two severance cuts, one at each end of the defect in order to exclude at least most of the defect. However, a single cut in the vicinity of a small defect or through the heart of a small defect will suffice because of the removal of some material in the end matcher.

In the past, defect removal preparatory to end-and-edge trimming has been accomplished by reliance upon the skilled eye of a saw operator observing the boards as he placed them in line with an automatic saw usually foot operated for cutting out defects. This job was necessarily performed under some strain and was tiring because of the manual labor involved.

An object of the present invention is to increase the efficiency and speed of the defect cutting operation and particularly to relieve an operator of the task of directly operating the saw controls so that he may spend more time in careful preliminary handling and examination of individual boards for locating the defects.

A further object of this invention is an automatic mark sensing device incorporated in a defect cutting machine, by which pre-applied marks placed at the desired cutting locations on the boards are automatically sensed and the saw operated in direct response thereto as the boards being fed approach and reach the cutting station without further attention from the operator.

Another object of the invention is an improved mark sensing device adapted to operate electrical or other controls reliably despite possible skips or discontinuities in the applied marks due to surface roughness of a board or for any other reason.

Another object is to provide accurately timed and reliable automatic means by which an advancing marked board will be arrested and held for cutting in response to the sensing of each applied mark, will be immediately cut, and will thereupon be immediately released from the holding action and discharged, or displaced by the next incoming board, all in a rapid self-executing cycle or sequence and at an effective rate equal to or exceeding the rates heretofore attainable.

In the practice of the present invention boards are marked with electrically conductive lines, preferably soft graphite pencil lines, extending transversely to the board's length at the desired cutting locations and are fed endwise through a mark sensing defect cutter. Certain features of the invention reside in the apparatus comprising a first set of board-engaging, mark-sensing electrical contact elements interspaced with members of a second set of similar elements, the two sets of elements being connected to respectively opposite input terminals of electrically responsive mark-sensing circuit means. The latter means are operatively connected to the controls for the board holding means and saw actuating means.

Further features reside in the related apparatus comprising a delivery conveyor, a discharge conveyor, a stationary board support interposed between the conveyors, and clamp means responsive to the mark-sensing operation adapted to press and hold a board in stationary position against the board support at respective locations at opposite sides of an intermediately located cutting plane. Further features reside in the automatic cycling control apparatus by which the ensuing cutting and board release sequence is executed following initial board clamping.

In accordance with the method or system of the invention, therefore, boards are examined by an operator, are conductively marked at desired cutting locations, are placed in a hopper and thereupon automatically fed in endwise succession past the cutting station and mark-sensing means situated preferably just ahead of said cutting station. The boards are clamped and temporarily held for cutting at the proper instant in response to the sensing of each defect mark, whereupon the saw controls are automatically operated in order to sever the board at that location. Immediately thereafter release of the board permits its resumption of movement on the conveyor means followed by the severed piece of board and succeeding boards, the process being repeated as frequently as necessary, in response to defect marks applied by the operator in the supply of boards to the apparatus.

These and other features, objects and advantages of the invention will become more fully evident from the following description thereof by reference to the accompanying drawings.

FIGURE 4 is a plan view of the apparatus with parts broken away for clarity.

FIGURE 5 is a perspective view of the preferred form of board-engaging contact means by which electrically conductive line marks on the boards are sensed electrically.

FIGURE 6 is a side view of a modified pick-up or mark-sensing contact arrangement.

FIGURE 7 is a side view of a second alternative pick-up arrangement.

Figure 1:
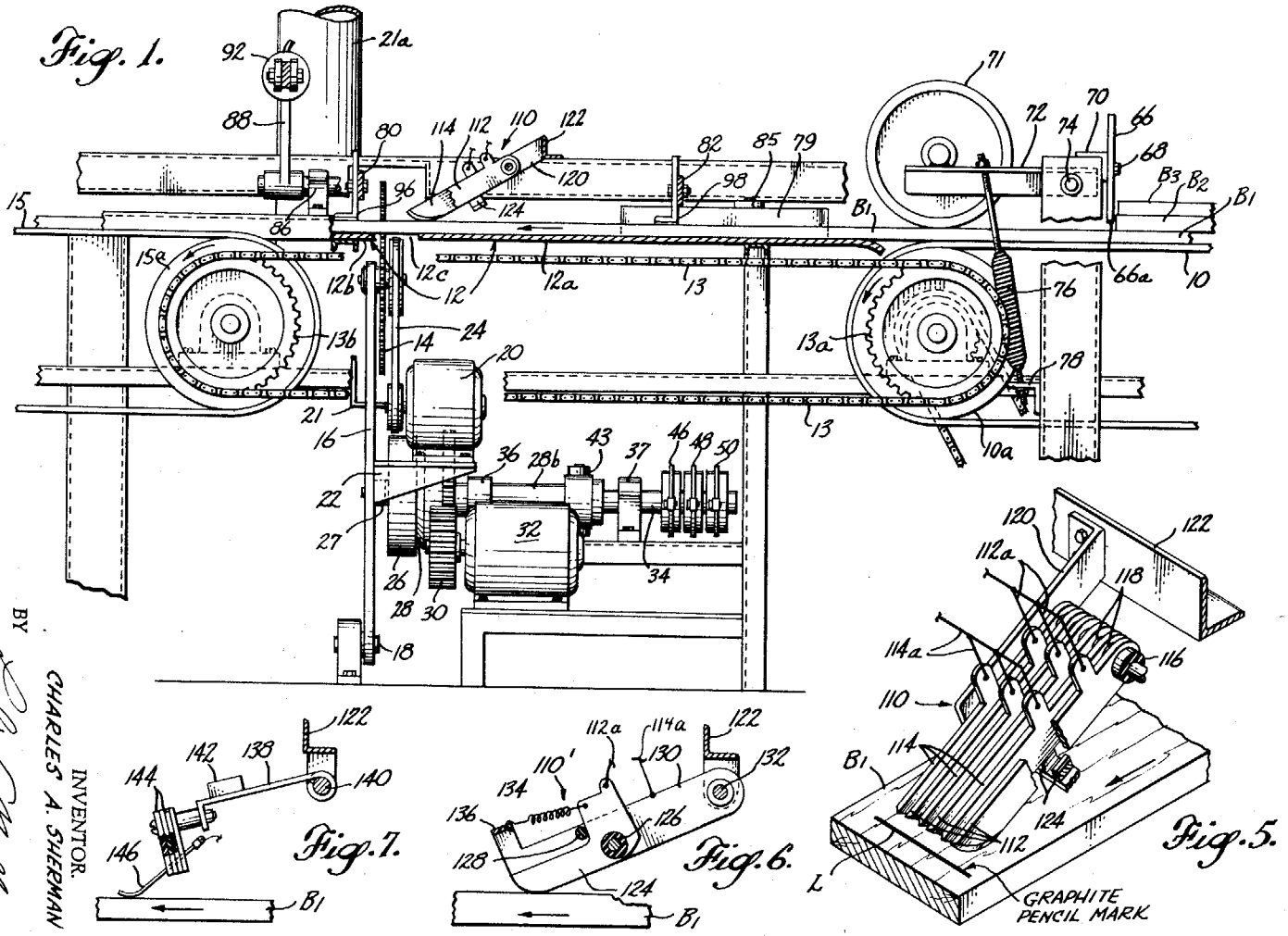
FIGURE 1 is a side elevational view, with parts broken away, illustrating certain details of the novel mark-sensing defect cutter apparatus.

Referring to the drawings, the mark-sensing defect cutter apparatus through which the successive boards B1, B2, B3, etc. are fed bearing the applied defect locating marks comprises an infeed or delivery conveyor including an endless belt 10 engaging a pair of rollers or sheaves, one of which, 10a, is shown in the view, and an output or discharge conveyor comprising the endless belt 15 and guide sheave 15a, spaced from the belt conveyor 10. Preferably the two conveyors travel at identical speeds, because of the drive chain 13 passing around sprockets 13a and 13b which are rotatively connected to the respective belt sheaves 10a and 15a. The conveyor drive power source itself is not shown. In the spacing between the mutually adjacent ends of these conveyors is situated a two-part board support or cutting table 12, having longitudinally spaced portions 12a and 12b defining a saw slot 12c between them. The saw itself, 14, is mounted on a supporting arm 16 which swings on a fixed horizontal pivot 18. The saw motor 20 is mounted on a bracket 22 carried on one side of the saw arm. The motor runs continuously during operation of the machine and drives the saw through a belt 24 and associated pulleys as shown.

The saw arm 16 is actuated for cutting when required in reciprocatory fashion by a crank comprising a wheel 26 and connecting link 27. As shown in FIGURE 4, one face of the wheel is formed as the concave plate 26a of a cone clutch. The other clutch plate 28a comprises the face of a gear 28 which meshes with a pinion 30 continuously driven by a motor 32 mounted on the machine frame. The gear-clutch element 28 has a sleeve 28b with a flanged end 28c and is free both to rotate and slide lengthwise on a shaft 34, supported and guided by collars 36 and 37, respectively. Movement of the clutch-gear unit 28 longitudinally of the shaft is effected by means of an actuating lever 38 mounted on a stationary pivot 40 situated intermediate the ends of the lever. One end of the lever comprises a conventional universal yoke-type coupling 43 which engages and permits rotation of the flanged end 28c of the sleeve 28b while being adapted to exert longitudinal thrust thereon to shift the same for engaging and disengaging the clutch members. The opposite end of the lever 38 is pivotally connected to the piston rod 42a of the fluid-operated jack 42 supported by a connection 44 on the machine frame. The shaft 34 is secured to the clutch wheel 26a to turn with the latter and carries fixedly on its opposite end a plurality of electrical rotary switch-actuating cams 46, 48 and 50 adapted to actuate the electrical switches 52, 54 and 56 respectively, at selected times during each cycle of shaft rotation corresponding to a full cycle of saw movement, in a manner and for purposes to be described hereinafter.

Figure 2:
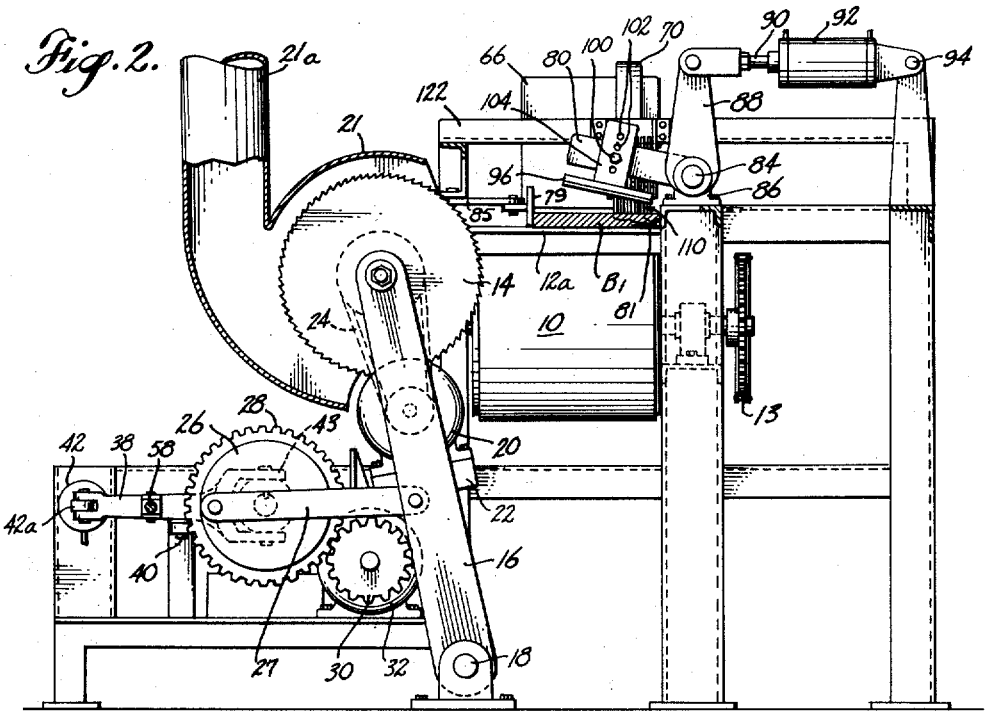
FIGURE 2 is an end elevation view of the apparatus with certain parts removed for clarity of illustration and with the saw shown in its retracted position.
Figure 3:
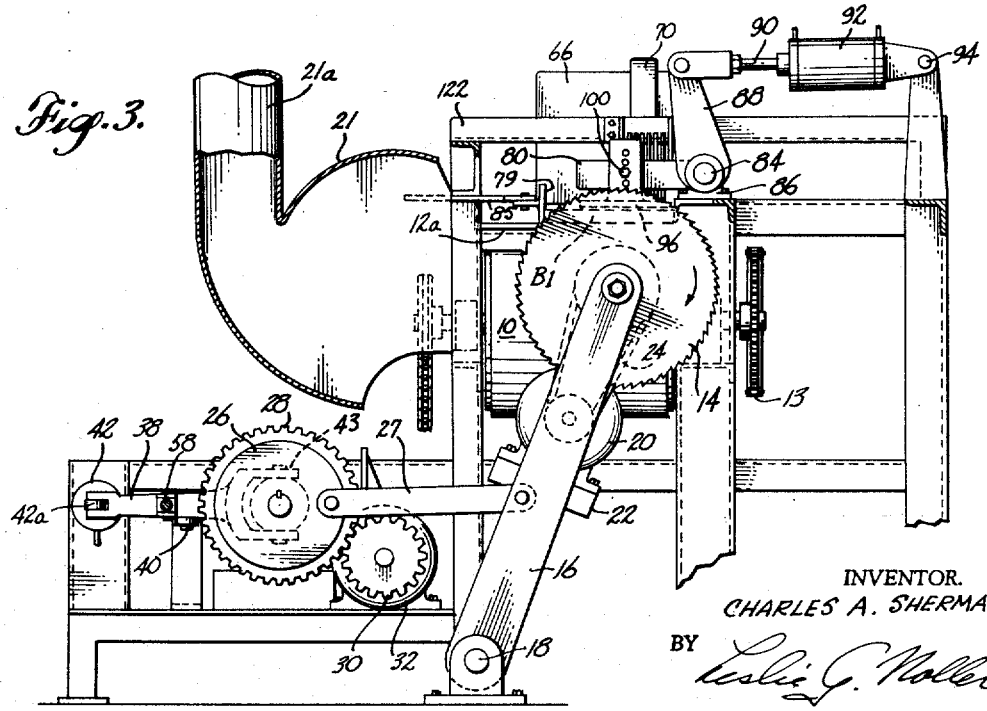
FIGURE 3 is a similar end elevation view with the saw shown in its extended or mid-cycle cutting position.

Pivotally secured to the lever 38 at a location intermediate its pivot 40 and its outer end is a brake-actuating rod 58. The opposite end of this rod is pivotally connected to a bell crank 60 which carries a brake shoe 62 adapted to bear against the peripheral surface of the wheel 26. This it does to hold the wheel in a stationary position when the saw is in its fully retracted position (FIGURE 2).

When the fluid jack 42 is actuated to force the clutch plates together the brake is simultaneously released in order to free the wheel 26 for rotation, which moves the saw arm through a cycle of reciprocation. The cyclic operation of the saw and the controls by which it is effected will be described hereinafter.

Sawdust is collected in a hood shown partially in the views as comprising the saw shield 21 and the duct 21a which is returned to a source of suction (not shown) which draws the sawdust to a suitable point of disposal.

The boards B1, B2, B3, etc., to be cut as and where required are fed in sequential manner through the machine, past the cutting plane of the saw, by the action of conveyor 10 cooperating with the feed-control fence 66. The lower edge 66a of this fence is spaced above the upper surface of the conveyor belt 10 by a distance slightly exceeding the thickness of one board and is adjustable in this respect to accommodate boards of different thickness by means of a bolt 68 engaging a frame bracket 70.

Consequently only the lowermost board, i.e., that in contact with the belt is free to pass the fence 66. The weight of the board and those resting upon it behind the fence 66 together with the coefficient of friction between the belt and the bottom surface of the lowermost board are sufficient to feed that board in a forward direction toward the saw. However, it is sometimes desirable to increase the friction for board feed purposes as by providing a hold-down roller 71 supported on an arm 72 pivoted at 74. A spring 76 with adjustable take-up shackles anchored to the frame bracket 78 at one (lower) end and to the arm 72 at the opposite end may be provided to increase the pressure of the hold-down roller to any desired adjustable amount.

A spring-actuated yieldable and adjustable guide shoe 79 slidably engages one edge of the advancing board to press them laterally against the cutting fence 81. This guide shoe is carried by a spring-actuated arm 83 mounted on an adjustable support 85.

Despite the adequacy of traction between the board and the feed conveyor 10 to extract the lowermost board from the stack and advance that board progressively past the sawing plane and into contact with the discharge conveyor 15, the feed action is nevertheless of an impositive nature so that the board may be stopped at any instant in order to hold it for cutting. The arresting or holding means by which this is accomplished as and when required comprises the clamp arms 80 and 82 mounted in parallel relationship at longitudinally spaced locations on the rocker shaft 84 which is journaled in suitable supports mounted on the machine frame. The shaft is rocked by a lever arm 88 secured pivotally at its outer end to the piston rod 90 of a fluid-actuated jack 92 mounted on the frame at 94. The arm 80 carries a clamp 96, and the arm 82 a clamp shoe 98, both adapted to bear downwardly against the top face of the board in frictional holding contact therewith. The arms 80 and 82 are located respectively above the table portions 12b and 12a so that downward pressure of the clamp shoes will be resisted by the underlying table surfaces. By slightly elevating the upper surfaces of the table portions 12a and 12b above the plane of the top surfaces of belts 10 and 15 the clamping action does not increase the board feed force against which it was to be effective in order to hold the board stationary. One clamp shoe engaging the board on each side of the cutting plane is desirable in order to hold the board securely through the cutting stroke of the saw so that the saw will not bind by any tendency for the boards otherwise to shift out of alignment due to the pressure of the saw when making the cut. Also both parts of the severed boards are then held securely in position and in alignment with the conveyor belts while the saw executes its backstroke upon completion of the cut.

The clamp shoes 96 and 98 are mounted on the respective arms 80 and 82 pivotally by means of bolts 100 selectively engageable in any of different apertures 102 located at intervals along the supporting bars 104 which project upwardly from the back sides of each clamp shoe, thereby to permit adjusting the clamp shoes to accommodate boards of different thickness and permitting, by pivotal action, the clamp shoes to settle onto the surface of each board with uniform pressure of contact in all areas engaged.

As the boards B1, B2, B3, etc., are stacked by the operator on the infeed conveyor 10 ahead of the fence 66, the operator places marks at the desired cutting locations with a graphite pencil or any other suitable means producing surface electrical conductivity on the board. Preferably these marks are applied as lines L, such as the lines L1 and L2 shown on the board B1 in FIGURE 4. These lines may be drawn freehand on the board across its width or a portion thereof so as to fall approximately into alignment with electrical pick-up unit 110 comprising (FIGURE 5) two sets of interspaced contact elements which slidably engage the top surface of the board. The elements of one set are designated 112 and the elements of the other set are designated 114 and are individually spaced between the elements of the first set. The elements of one set are electrically interconnected by means of the conductor 114a, and the elements of the other set, 112, are similarly interconnected electrically by the conductor 112a. In the form illustrated in FIGURE 5 these sliding contact elements comprise steel or other ferromagnetic and electrically conductive bars which are freely pivoted on a horizontal insulating support 116 mounted above and extending transversely to the conveyor run. The pick-up contact bars extend at an incline downwardly therefrom and rest in trailing position in the advancing boards. The mutually adjacent contact elements are spaced apart and electrically insulated from each other by insulating collars or shims 118 interposed between them surrounding the insulating shaft 116, such shaft being mounted on a bracket 120 which is mounted on a cross member 122 comprising part of the machine frame overlying the boards. The board-engaging ends of successively adjacent contacts 112 and 114 have edges preferably beveled alternately at opposite sides as suggested in FIGURE 5. Also mounted between these brackets 120 and beneath the parallel contact arms 112 and 114 is a stop assembly which incorporates an array of permanent magnets 124 which attract the elements individually downwardly against the surface of the boards and thereby also provide electromagnetic damping action minimizing any tendency of the contacts to bounce and to vary materially in pressure of contact with the board. To this end magnetic inserts (not shown) may be mounted in the elements 112 and 114 if such elements are of paramagnetic or nonmagnetic material, although when, as described, such elements are of ferromagnetic material such inserts are, of course, unnecessary. This or an equivalent hold-down means for the pick-up contacts may become particularly important in the event it is necessary to place a mark near the advance end of the board which mark might go undetected should there be an excessive tendency for the contact elements to bounce over the end edge during the advance of the board beneath them initially.

In the modified contact unit 110' shown in FIGURE 6 the individual contact elements 124 are of L-shape and are pivotally mounted on insulating supports 126. The pivotal supports 126 are individually carried by one or two pivoted support arms 130 which also function as contact elements. The support arms 130 themselves in this case are individually pivotally mounted at 132 on the machine frame bar 122. Relative swinging of each contact element 124 on its swinging support arm or arms 130 is limited by a stop 128 of insulating material and the contact element is urged against this stop normally by a light spring 134 which extends between the projecting upper end of the contact element and an insulating bracket 136 mounted on the support arm 130. Thus, the mass or weight of the arm assembly tends to hold the arms in a given position with relation to boards and to permit the boards to vary materially in thickness whereas minor surface irregularities are accommodated by the freedom of the individual contact elements 124 to pivot relative to the mass position of the arms 130.

In the further alternative shown in FIGURE 7 a supporting plate 138 is pivoted on a shaft 140 and corresponds to the arms 130 in FIGURE 6. In this instance a weight 142 is mounted on the plate 138 to urge the same in the direction toward the boards. An insulating carrier 144 is carried by the swinging end of the plate 138 and in turn is adapted to support individual spring-like contacts 146 in parallel relationship to engage the board surface as in the preceding embodiments. However, this modification is generally not considered as fully satisfactory as the forms shown in FIGURES 5 and 6 because of the tendency of the spring-like elements 146 to wear out too quickly by abrasion on the boards over a period of time.

Figure 8:
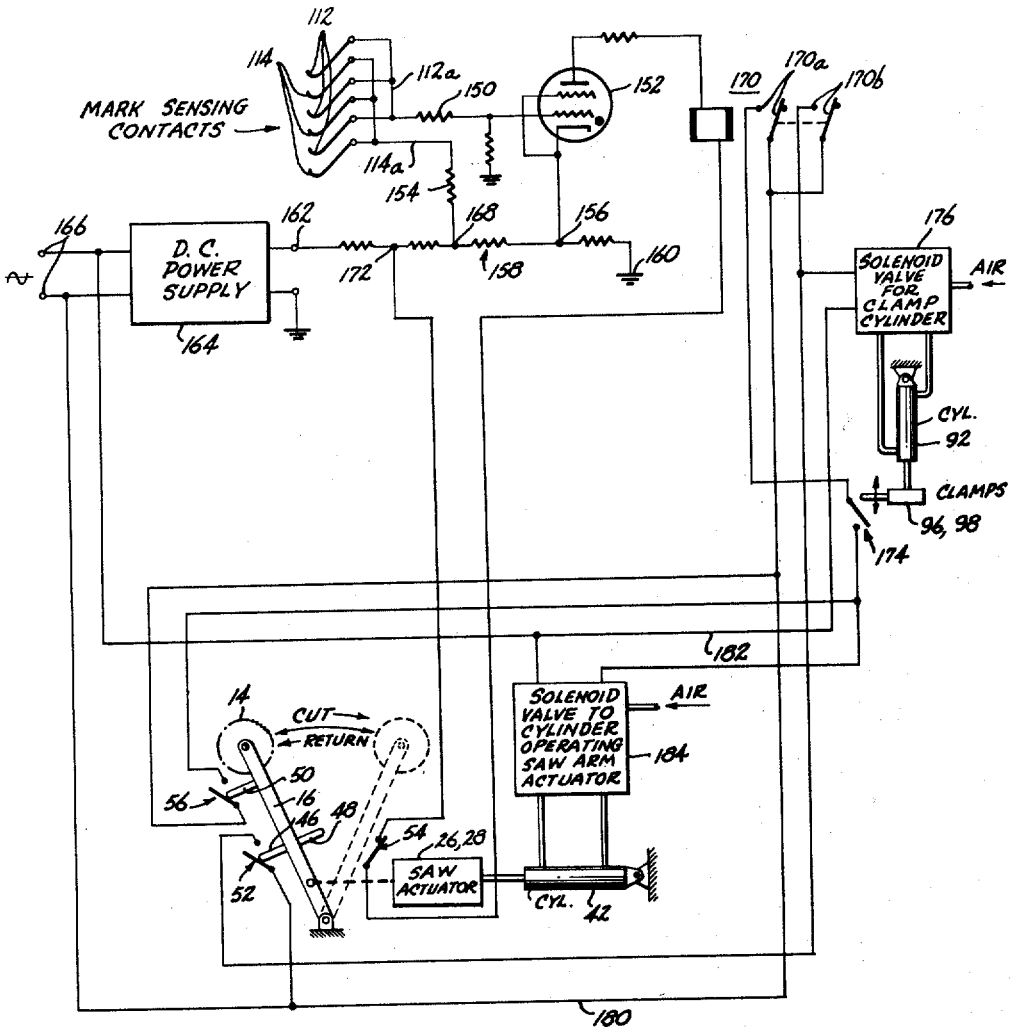
FIGURE 8 is a simplified schematic diagram of the electrical control apparatus associated with the mark-sensing pick-up contacts and with the saw and board clamp actuating means.

Referring now to the control circuit arrangement shown in FIGURE 8 and to its relationship with the illustrated form of the mechanical apparatus involved, the contact element conductor 112a is connected through a grid resistance 150 to the control grid of a gaseous discharge tube or amplifier such as the thyratron 152. The conductor 114a is referenced to the cathode, through a second resistance 154 which becomes serially connected with the resistance 150 through the contact elements when the latter are bridged across electrically by the passing of a graphite line mark beneath them. The cathode of tube 152 is connected to its screen grid and is returned to a point near ground potential such as the tap point 156 in the voltage divider 158. The multiple resistance of the voltage divider 158 is connected between ground at 160 and the positive terminal 162 of the D.C. power supply 164. The latter is energized from the A.C. source terminals 166. The resistance 154 is connected to a higher point 168 in the voltage divider to provide a grid-drive voltage source so that a positive impulse will be applied to the control grid of this tube when any contact 112 is electrically connected to any other contact 114 through a bridging portion of a graphite line mark on a board. Any such impulse applied to the control grid of tube 152 ionizes the tube and causes electrical current to flow through the control winding of relay 170. Such plate current flow takes place through the normally closed contacts of switch 54 in a circuit including the point 172 of relatively high potential in the voltage divider 158. Once the tube 152 has been ionized it remains conductive until switch 54 is opened.

The function of the relay 170, energized by conduction in tube 152, is to initiate operation of the clamp-actuating cylinder at the proper time in order to arrest the advancing board when there is substantial registry of the defect line mark or cutting location on the board with the cutting plane of the saw 14. The position of contact of the assembly of sliding contact elements 112 and 114 with the board ahead of the cutting plane is such in relation to the speed of travel of the board and the inherent delays in the actuating mechanism for the clamps that this result will be achieved in every instance, at least to a sufficient degree of accuracy for all practical purposes.

Contacts 170b of relay 170 are connected so that, when closed, they form an energizing circuit for the solenoid valve 176 controlling supply of air or other fluid to hydraulic jack 92. This energizing circuit includes the conductor 180 connected to one of the input A.C. terminals and the conductor 182 connected to the other input A.C. terminal. Energization of the solenoid valve 176 actuates the cylinder 92 and thereby the clamps 96 and 98 to grip and hold the board. Such closing movement of the clamps actuates and closes a switch 174 whose contacts are connected serially with contacts 170a of relay 170 and with the winding of a solenoid valve 184 by which flow of air to the cylinder of jack 42 is controlled. With the relay 170 energized and the switch 174 closed energizing current from terminals 166 flow through the coil of solenoid valve 184 to actuate the jack 42 and initiate the cutting stroke of the saw 14. Though the conductive mark on the board causing firing of tube 152 has passed the contacts 112, 114, the tube remains ionized and the relay 170 energized as the saw executes the cutting stroke. Upon completion of the cutting stroke, normally closed switch 54 is opened by the switch actuator 48, thereby interrupting the plate circuit for tube 152 and deionizing such tube. However, this does not produce deenergization of the solenoid valve 184 nor disengagement of the clutch members 26a, 28a, even though relay 170 has now become deenergized. Instead, the saw actuator continues to execute its complete cycle of reciprocation by returning to its starting position due to the fact that an alternate energizing circuit for the coil of solenoid valve 184 is established through the contacts of switch 56 which are closed at all times except when the saw is in its fully returned position. The contacts of switch 56 are connected between conductor 180 and that side of switch 174 which is connected directly to one side of the coil of solenoid valve 184, thereby in effect to by-pass the relay contacts 170a. Switch 56 therefore constitutes a holding means assuring completion of the return stroke of the saw despite deenergization of tube 152 and relay 170. A third switch, 52, having normally closed contacts, also serves a holding function, in this case that of assuring continued clamping action by the clamps 96 and 98 throughout the full cutting stroke and return of the saw. Thus, the contacts of switch 52, which are opened by means 46 only upon completion of the saw-return stroke, are connected between conductor 180 and that side of the coil of solenoid valve 176 which is connected directly to one terminal of relay contacts 170b. Thus, when relay 170 becomes deenergized upon completion of the cutting stroke of the saw there is still an energizing circuit for the coil of solenoid valve 176 through the closed contacts of switch 52. When the saw completes its return stroke, however, switches 56 and 52 are opened by the means 50 and 46, respectively, thereby to deenergize the coil of solenoid valves 184 and 176 so as to lift the clamps and disengage the clutch plates, 26a and 28a, whereupon the brake 62 is automatically applied to stop rotation of the saw drive crank 26, 28. With completion of the cycle the severed pieces of board resume their advance on the conveyors 10 and 15.

For convenience in illustration the switches 52, 54 and 56, which are shown in FIGURE 4 as rotary cam actuated switches, are reduced to an equivalent and perhaps more readily illustrated form in FIGURE 8 wherein the illustrated switches are shown to be actuated by push rods mounted on the saw arm 16. Switch 174 appearing in FIGURE 8 is not shown in the mechanical views but the nature and manner of installation of such a switch will be readily apparent. Likewise the solenoid valve units 176 and 184 as well as certain other circuit components are omitted from the mechanical views for simplicity in the illustration and in view of the fact that the details of such are well known.

The operation of the apparatus may be briefly summarized as follows:

Individual boards bearing graphite or other electrically conductive transverse line marks applied by the inspector at the desired cutting locations on each board having a defect are advanced on conveyor 10 toward the aligned conveyor 15 and past the assembly of mark-sensing electrical contact elements 112 and 114, located just ahead of the cutting plane of the saw 14. Because of the plurality of contact elements 112 and the plurality of intervening contact elements 114, each connected to the respective conductors 112a and 114a, any portion of a line mark which bridges between any two unlike contact elements will trigger the gas tube 152 and energize the relay 170, thereby actuating the solenoid valve 176 and operating the clamps 96 and 98, to arrest movement of the board. The time interval between sensing of the mark and full actuation of the clamps is such that the line mark or the defect point which it identifies has now advanced substantially into alignment with the cutting plane of the saw 14.

Completion of clamp actuation movement, closing switch 174, actuates the solenoid valve 184 to initiate the cutting cycle of the saw. Completion of the cutting stroke of the saw, opening switch 54, deenergizes relay 170 by breaking the plate circuit for gas tube 152. However, the holding action of switches 52 and 56 assure continued energization of the coils of solenoid valves 176 and 184, respectively, and thereby continued holding of the board by the clamps 96 and 98 and completion of the saw return movement. Completion of such movement, opening switches 52 and 56, causes the solenoid valves to return to their normal positions, thereby raising the clamps and disengaging the drive mechanism for the saw arm. At this time a brake is applied holding the saw firmly in its rest or retracted position.

It will be observed that the action is positive and self-executing. A high degree of sensitivity is attained to line marks drawn by an operator, and even though the board is rough or any other condition exists causing breaks or skips in the line, the multiplicity of interspaced sets of contacts testing successive portions of the length of the potential marking zone assures that any such mark will be detected and the board will be properly cut. The operator is afforded ample time to inspect and handle the boards thoroughly before stacking them up behind the fence 66 since he need pay no attention to the operation of the mark-sensing defect cutter itself. Consequently, better inspection and grading of boards is obtained and more consistently reliable results lessening any need for subsequent inspections. The invention at relatively low cost yields higher quality results at greater production rates than heretofore, with less strain imposed on a human inspector.

I claim as my invention:

1. In a mark sensing lumber defect cutter having a transversely reciprocative cut-off saw, conveyor means to advance boards endwise in succession through the cutting plane of the saw, aligned stationary board supports interposed in the path of conveyance and having a gap therebetween at the cutting plane to pass the saw therebetween when reciprocated, and saw operating means operable to reciprocate the saw from a normally retracted position through a cutting stroke and back to said position; the combination therewith comprising reciprocative clamp means supported and movable independently of said cut-off saw and including a pair of clamp shoes, and means movably supporting said clamp shoes in normally retracted position withdrawn from but in registry with the respective board supports and guiding such shoes for movement thereof conjointly toward such supports to clamp and immobilize a board directly therebetween independently of saw movement, mark sensing means including pick-up means mounted adjacent one of the supports ahead of the cutting plane and operable to detect an applied defect-locating mark on an advancing board, electric circuit means responsively connected to said pick-up means and controllingly connected to said clamp means for energizing the same to apply said shoes to the board backed by said stationary supports in response to a passing mark so detected, electric switch means arranged to be actuated in response to application of the clamp shoes to clamp a board and controllingly connected to the saw operating means to energize the same, thereby to initiate a cycle of saw reciprocation in response to such actuation, and additional switch means arranged to be automatically actuated by completion of said saw cycle and having means connected in said circuit means and also means connected in circuit with the first switch means operatively to withdraw the clamp shoes and to terminate energization of the reciprocative saw-operating means, respectively, in response to such latter actuation.

2. Mark sensing lumber defect cutter apparatus comprising conveyor means to support and advance boards endwise in successive order, said conveyor means having a gap therein, a cut-off saw mounted for operation in a plane transverse to the extent of and situated in said gap, clamp means mounted independently of the saw mount, located in the vicinity of the saw plane and operable to grip and hold a board stationary for cutting by the saw, electrically responsive mark-sensing means including elements situated adjacent the line of conveyance ahead of said saw plane, said mark-sensing means being operable to sense an electrically conductive mark applied to a board designating a defect cutting location thereon, said mark-sensing means being operatively connected to said clamp means to operate the same in response to sensing of the applied mark, whereby the board is arrested in a position of substantial registry of the defect cutting location with the saw plane, saw-actuating means operable to move the saw for severing the clamped board, means connected to said saw-actuating means and connected to be controlled to operate said saw-actuating means in response to said clamping means being placed in operative position for gripping and holding a board, and means connected to said clamp means and connected to be controlled by operation of the saw-actuating means to release the board by substantial completion of such saw movement.

3. Mark sensing lumber defect cutter apparatus comprising conveyor means to support and advance boards endwise in successive order, said conveyor means having a gap therein, a cut-off saw mounted for operation in a plane transverse to the extent of and situated in said gap, clamp means mounted independently of the saw mount, located in the vicinity of the saw plane and operable to grip and hold a board stationary for cutting by the saw, electrically responsive mark-sensing means including elements situated adjacent the line of conveyance ahead of said saw plane, said mark-sensing means being operable to sense an electrically conductive mark applied to a board designating a defect cutting location thereon, said mark-sensing means being operatively connected to said clamp means to operate the same in response to sensing of the applied mark, means to actuate the saw through a cutting cycle, saw-actuating control circuit means including a switch actuated by movement of said clamp means into board holding position, thereby to initiate saw actuation, holding circuit means maintaining the clamp means in operating position, holding circuit means maintaining the saw-actuating circuit means operable to complete the saw actuation cycle, and means connected to the respective holding means and operable by cycle-completion movement of the saw to interrupt said holding circuit means preparatory to a succeeding mark sensing operation.

4. The device of claim 3 in which said mark-sensing means comprises a first plurality of electrical contact elements arranged in successively spaced series relationship and simultaneously engageable with such surface, a second plurality of electrical contact elements interposed individually in the spaces between the first-mentioned contact elements and electrically insulated therefrom, support means for mounting all of said electrical contact elements to permit movement thereof individually toward and from a board surface, thereby to ride independently thereon over irregularities on such board surface accompanying relative endwise movement of the board past said sensing means, conductive means electrically interconnecting all of the contact elements of the first-mentioned plurality, conductive means electrically interconnecting all of the contact elements of the second plurality, and electric circuit means having an input across which the respective conductive means are connected electrically, said circuit means including means responsive to an electrical impulse passing through the line mark bridging between any contact element of the first-mentioned plurality and any contact element of the second-mentioned plurality.

5. The combination defined in claim 4, wherein the electric contact elements comprise a plurality of elongated conductive members disposed in substantially parallel relationship at an incline to the surface of the boards and adapted to trail thereon in relation to the direction of board movement, and means pivotally supporting said elongated conductive members about a substantially common axis to permit independent pivoting of said members individually toward and from said surface.

6. The combination defined in claim 5, and magnetic damping means magnetically attracting said elongated contact elements in the direction toward said article surface, including permanent magnet means and cooperating ferromagnetic means, one such means being stationarily mounted on the support means and the other such means being comprised in the individual elongated contact elements.

7. The means defined in claim 4, wherein the circuit means comprises a source of voltage connected in series with the two groups of contact elements to apply voltage thereacross, whereby a current impulse is permitted to flow in the input of said circuit means by a conductive line mark bridging such contact elements.

8. The combination defined in claim 1, wherein the circuit means includes a gaseous discharge amplifier having a grid circuit including serially therein the pick-up means and a grid-drive voltage source having an output applied to the amplifier grid by the pick-up means to render the amplifier conductive in response to detection of a mark by said pick-up means, said amplifier having a plate circuit including a direct-voltage source, and means energizable by plate current flow in the amplifier to effect energization of the clamp means, and means included in the amplifier plate circuit and operated by reciprocation movement of the saw to interrupt plate current flow in the amplifier.

9. The combination defined in claim 8, wherein the means energizable by plate current flow in the amplifier comprises a relay having a first set of contacts operable to energize the clamp means in response to plate current flow in the amplifier, and having a second set of contacts operable to form partially an energizing circuit for the saw-operating means in response to plate current flow in the amplifier, said partially formed circuit including the first-mentioned switch means and being completed by actuation of the first-mentioned switch means in response to application of the clamp shoes to clamp a board.

10. The combination defined in claim 9, wherein the means included in the amplifier plate circuit and operated by cutting movement of the saw to interrupt plate current flow in the amplifier comprises a switch actuated by movement of the saw out of its normally retracted position, and wherein the said additional switch means includes a first saw-operated switch connected to the clamp means, and a second saw-operated switch connected to the saw-operating means, both of said saw-operated switches being held open by the saw in its normally retracted position and both being closed by movement of the saw out of such normal position, thereby to complete direct energizing circuits for both the clamp means and the saw-operating means, whereby interruption of plate current flow in the amplifier by actuation of the saw-operated switch in the plate circuit of the amplifier does not terminate the clamping action nor the saw reciprocation.

11. Means for sensing an electrically conductive line mark applied to an article subject to surface roughness and irregularities, tending to produce gaps in such line mark, said means comprising a plurality of electrical contact elements arranged in successively spaced series relationship and simultaneously engageable with such surface, a second plurality of electrical contact elements interposed individually in the spaces between the first-mentioned contact elements and electrically insulated therefrom, said electric contact elements comprise a plurality of elongated conductive members disposed in substantially parallel relationship at an incline to the surface of the article, means for pivotally mounting all of said electrical contact elements about a substantially common axis to move individually toward and from said surface, thereby to ride independently over irregularities accompanying relative movement between said surface and contact elements in the direction of extent of said surface, magnetic damping means magnetically attracting said contact elements in the direction toward said article surface, including permanent magnet means and cooperating ferromagnetic means, one such means being stationarily mounted on the support means and the other such means being comprised in the individual contact elements, conductive means electrically interconnecting all of the contact elements of the first-mentioned plurality, conductive means electrically interconnecting all of the contact elements of the second plurality, and electric circuit means having an input across which the respective conductive means are connected electrically, said circuit means including means responsive to an electrical impulse passing through the line mark bridging between any contact element of the first-mentioned plurality and any contact element of the second-mentioned plurality.

*12. Chop saw apparatus comprising an elongated normally constantly driven continuous friction-type feed conveyor belt for carrying boards lengthwise along a path, means for holding a stack of boards above said conveyor belt with the bottom board of the stack resting on the conveyor belt and constantly urged forwardly thereby, an elongated continuous off-bearing conveyor belt spaced forwardly of the discharge end of the feed conveyor belt and receiving boards as they are advanced thereto by said feed conveyor belt, a nontraveling support between the discharge end of the feed conveyor belt and the feed end of the off-bearing conveyor belt, a circular saw disposed transversely of the path of boards between the feed and off-bearing conveyor belts and mounted to one side of said path and between said discharge and feed ends, power-actuated means for clamping a board on said support as it passes from said feed conveyor belt to said off-bearing conveyor belt, such board when clamped on said support serving to block the forward movement of boards along the constantly driven feed conveyor belt, power-actuated means for moving said saw in a cutting pass by shifting it into and then out of a board positioned on said support, and sensor means spaced toward said feed conveyor belt from said saw responsive to a deposit prepared on a board and connected to the power-actuated means for clamping a board and the power-actuated means for moving said saw so as to regulate their actuation.*

*13. Chop saw apparatus comprising an elongated friction-type normally constantly driven conveyor means defining a path for the movement of boards lengthwise therealong, a hopper mounted above said conveyor means and constructed to hold a stack of boards with the bottom layer of boards of such a stack supported on said conveyor means, said hopper being constructed to accommodate the removal of bottom layers of boards from under such a stack under the urging of said conveyor means, a nontraveling support disposed forwardly of the discharge end of said conveyor means, clamping means mounted adjacent said nontraveling support, means for actuating said clamping means whereby it is operable to hold a board firmly in place on said nontraveling support, such board when clamped serving to block the forward movement of boards along the constantly driven conveyor means, a power-driven saw mounted to one side of said support, and a mounting for said saw whereby it is movable in a cutting pass to cut a board held stationary by said clamping means.*

References Cited by the Examiner

The following references, cited by the Examiner, are of record in the patented file of this patent or the original patent.

UNITED STATES PATENTS

| | | | |
|---|---|---|---|
| 702,808 | 6/02 | Lyman | 200—46 XR |
| 1,933,693 | 11/33 | Adatte. | |
| 2,309,343 | 1/43 | Farrow | 83—371 X |
| 2,327,920 | 8/43 | Moohl | 83—380 |
| 2,377,783 | 6/45 | Hood | 200—46 X |
| 2,652,864 | 9/53 | Anguera. | |
| 2,781,573 | 2/57 | Espari | 83—380 X |
| 2,796,480 | 6/57 | Knorr | 200—61.14 |
| 2,871,940 | 2/59 | Meunier | 83—371 X |

WILLIAM W. DYER, JR., *Primary Examiner.*